UNITED STATES PATENT OFFICE.

WALTHER STRAUB, OF FREIBURG, GERMANY, ASSIGNOR TO C. F. BOEHRINGER & SOEHNE, OF MANNHEIM-WALDHOF, BERLIN, GERMANY.

ART OF PREPARING ALKALOID SALTS.

1,061,139.   Specification of Letters Patent.   Patented May 6, 1913.

No Drawing.    Application filed June 15, 1912.  Serial No. 703,924.

*To all whom it may concern:*

Be it known that I, WALTHER STRAUB, a citizen of the German Empire, residing at Freiburg, Baden, have invented certain new and useful Improvements in the Art of Preparing Alkaloid Salts; and I do hereby declare the following to be a full, clear, and exact description of the invention, such as will enable others skilled in the art to which it appertains to make and use the same.

The present invention relates to the manufacture of alkaloid salts and, in particular, of salts containing morphin.

The use of morphin as a remedial agent is often attended with a paralysis or disorder of the respiratory center and the object of the present invention is to eliminate this undesirable property of morphin in an effectual way. It is found by me in this connection that this attendant effect of morphin can be greatly reduced and even suppressed if morphin is administered together with narcotin. Since it is desirable to have these alkaloids combined in fixed proportions in the product to be administered or prescribed it was my aim to devise a method of obtaining products of this character. As a result of my researches and experiments I have found that alkaloid salts containing morphin and narcotin in respectively molecular proportions may be obtained if a polybasic inorganic or organic acid is caused to react on morphin and narcotin. By employing dibasic or tribasic acids, or acids of even higher basicity, for this purpose I have obtained salts containing morphin and narcotin either in equal molecular proportions or in the proportions of one molecule of morphin to two or more molecules of narcotin, or of one molecule of narcotin to two or more molecules of morphin. It will be seen, therefore, that by my invention I am able to obtain a large variety of chemical compounds each containing fixed proportions of morphin and narcotin, but each differing from all the others in the relative quantities of the two alkaloids contained therein.

The new double-salts embodying one part of my invention are formed generically by causing an acid or a salt thereof to re-act on the two alkaloids, and this reaction specifically considered, may take place in various ways. For instance, I may obtain the new compounds by evaporating an aqueous or an alcoholic solution of the ingredients; by precipitating the same from an alcoholic solution of the ingredients by ether or by a double decomposition of their salts. The new compounds thus produced are obtained as crystalline bodies, which are for the most part readily soluble in alcohol and readily soluble in hot water. Many of them are also tolerably soluble in cold water. In ether and other usual organic solvents they are insoluble. The salt combining one molecule of morphin and one molecule of narcotin with one molecule of meconic acid has been found particularly valuable for medicinal purposes.

In order to fully disclose my invention I will now describe a number of examples embodying what I consider the preferred manner of carrying out the same. The proportions given are all understood to be by weight.

*Example 1—Meconate of morphin and narcotin.*—2.54 parts of meconic acid are dissolved in about 50 parts of hot alcohol and then 3.03 parts of finely pulverized morphin and 4.13 parts of narcotin are added in succession. The whole is then filtered and the resultant salt is precipitated from the filtrate by ether. The new double salt of morphin and narcotin is thereby obtained in the form of uniform small white crystals which are readily soluble in water and hot alcohol. This new compound contains four molecules of water of crystallization. Its constitution is expressed by the formula:

$$C_7H_4O_7.C_{17}H_{19}NO_3.C_{22}H_{23}NO_7+4H_2O$$

By an analysis of the dehydrated compound the following figures were obtained:

C—61.15%; H—5.26%.
Correction for $C_{46}H_{46}O_{17}N_2$: C—61.47%; H—5.12%.

The percentage of water of crystallization for the crystalline compound was found to be 7.9% which is sufficiently near to 7.5% as obtained from the formula.

*Example 2—Morphin-dinarcotin-benzoltrisulfonate.*—3.72 parts of benzene-trisulfonic acid are dissolved in 50 parts of 50% alcohol and to the solution are added alcoholic solutions containing 3.03 parts of morphin, corresponding to one molecule, and 8.26 parts of narcotin, corresponding to two molecules. The whole is then filtered and the filtrate is evaporated at about 50°, centigrade. The new salt thus obtained is soluble with difficulty in cold water and readily soluble in hot water and in alcohol.

The composition of this new compound is represented by the formula:

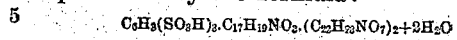

which would correspond to the following percentages:

C—54.85%; H—5.19%; S—6.55%

The percentages by actual analysis were:

C—55%; H—5.22%; S—6.47%

*Example 3—Morphin-narcotin-phenol disulfonate.*—4.69 parts of the barium salt of phenol-disulfonic acid are dissolved in 100 parts of water and then aqueous solution of 3.79 parts morphin-sulfate and 4.98 parts of narcotin-sulfate is added to the same. The whole is then heated for some time on a water-bath. The whole is then put on the filter to separate the precipitated barium-sulfate and the filtrate is evaporated *in vacuo*. The new double salt thus obtained is soluble with difficulty in cold water, but readily soluble in alcohol and hot water. Its composition is indicated by the formula:

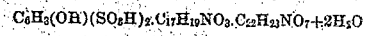

*Example 4—Morphin-dinarcotin-salicyl-odisulfonate.*—3.7 parts of salicyl-disulfonic acid whose formula is $C_6H_4(OH)(COOH)(SO_3)H_2$ and which is described in *Gazzetta Chimica Italiana*, vol. 18 (1888) page 347, are dissolved in 50 parts of hot 50% alcohol and to the hot solution there are added in succession, 3.03 parts of morphin, corresponding to one molecule, and 8.26 parts narcotin, corresponding to two molecules, and thereupon the resultant solution is evaporated *in vacuo*. The new salt thus obtained is soluble with difficulty in hot or cold water and readily soluble in alcohol. Its constitution corresponds to the formula:

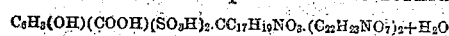

*Example 5—Dimorphin-narcotin-salicyl-odisulfonate.*—3.7 parts of salicylodisulfo-acid are dissolved, as in the preceding example, in 50 parts of heated 50% alcohol and to this hot solution there are added, in succession, 6.06 parts of morphin, corresponding to two molecules, and 4.13 parts of narcotin. The whole is then put on the filter and the filtrate is evaporated *in vacuo*. The new salt so obtained is soluble with difficulty in cold water, but readily soluble in alcohol and in hot water. Its composition is given by the formula:

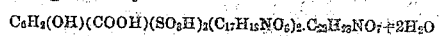

In all of the examples given it will be noted that the alkaloids morphin and narcotin are caused to react on a polybasic organic acid, that is to say an organic acid having two or more acid groups.

*Example 6—Sulfate of morphin-narcotin.—*

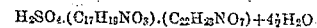

6 parts by weight of morphin and 8.2 parts by weight of narcotin are dissolved in 40 parts by weight of normal sulfuric acid and the whole concentrated *in vacuo*. The salt obtained is readily soluble in water and dilute alcohol and is distinguished from the mere mixture in molecular quantities of the separate sulfates by its melting point and by its different solubility, for instance, in water.

What I claim and desire to secure by Letters Patent of the United States is:

1. The process of preparing a double salt of morphin and narcotin which consists in reacting on a polybasic acid with morphin and narcotin.

2. The process of preparing a double salt of morphin and narcotin which consists in reacting on a polybasic acid with morphin and narcotin in molecular quantities, respectively.

3. The process of obtaining a double salt of morphin and narcotin, which consists in reacting on a polybasic acid with morphin and narcotin, and then separating the double salt from the mixture of the reaction.

4. The process of obtaining a double salt of morphin and narcotin, which consists in dissolving meconic acid in alcohol and adding thereto morphin and narcotin, filtering and adding ether to the filtrate to precipitate the double salt.

5. As a new composition of matter, a double salt in which morphin and narcotin are combined with a polybasic acid in respectively molecular quantities, said salt being soluble in alcohol and insoluble in ether.

6. As a new composition of matter, a double salt in which one molecule of morphin and one molecule of narcotin are combined with a dibasic acid, said salt being soluble in alcohol and insoluble in ether.

7. As a new composition of matter, meconate of morphin and narcotin having the formula:

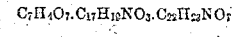

said double salt being readily soluble in water and hot alcohol and insoluble in ether, and combining with four molecules of water to form small white crystals.

In testimony whereof I hereunto affix my signature in the presence of two witnesses.

WALTHER STRAUB.

Witnesses:
  GEO. GIFFORD,
  ARNOLD ZUBER.